United States Patent [19]

Perot et al.

[11] 4,404,928
[45] Sep. 20, 1983

[54] METHOD OF EVAPORATING A PURE LIQUID

[75] Inventors: François Perot, Paris; Jacqueline Pouderoux, Meudon la Foret; Jacques Diez, Massy, all of France

[73] Assignee: Stein Industrie, Velizy-Villacoublay, France

[21] Appl. No.: 356,548

[22] Filed: Mar. 9, 1982

[30] Foreign Application Priority Data

Mar. 9, 1981 [FR] France .................. 81 04602

[51] Int. Cl.³ .................................. F22B 1/02
[52] U.S. Cl. ........................... 122/32; 62/56; 165/1
[58] Field of Search ............ 122/32, 4 R; 165/1; 62/52, 56, 79

[56] References Cited

U.S. PATENT DOCUMENTS

| 2,548,441 | 4/1951 | Morrison . | |
|---|---|---|---|
| 3,139,069 | 6/1964 | Zenz | 122/32 |
| 3,256,115 | 8/1966 | Maeir et al. . | |
| 3,445,627 | 5/1969 | Stephan | 122/32 X |

FOREIGN PATENT DOCUMENTS

| 990531 | 6/1961 | France . |
| 1066174 | 4/1967 | United Kingdom . |
| 1184015 | 3/1970 | United Kingdom . |
| 1476847 | 6/1977 | United Kingdom . |

*Primary Examiner*—Edward G. Favors
*Attorney, Agent, or Firm*—Sughrue, Mion, Zinn, Macpeak and Seas

[57] ABSTRACT

A method of evaporating a pure liquid (4) by indirect heat exchange between it and a hotter fluid, said liquid flowing under the effect of gravity along a heat exchange surface (1). The vapor formed flows in the same direction (6) as the liquid (4) and the liquid flow speed is adjusted as a function of the heat exchanged via the heat exchange surface so that at least half of the liquid has evaporated by the time the remaining liquid reaches the bottom of the heat exchange surface.

Application to heat exchanges using a liquid of which only a small volume is available.

3 Claims, 1 Drawing Figure

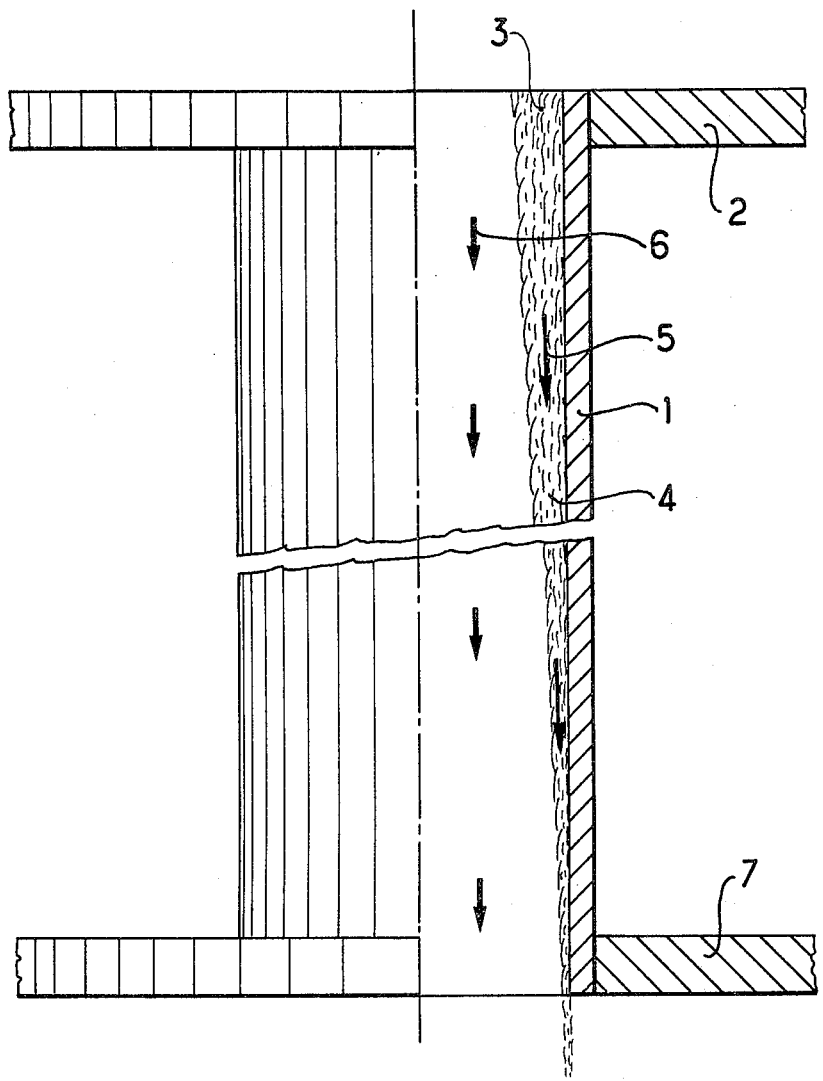

METHOD OF EVAPORATING A PURE LIQUID

The present invention relates to a method of evaporating a pure liquid by indirect heat exchange between it and a hotter fluid, by making said liquid flow down a heat exchange surface under the effect of gravity.

BACKGROUND OF THE INVENTION

Usually to evaporate a pure liquid, said liquid is made to flow, together with the vapour which forms in the neighbourhood of the heat exchange surface, in the same upward direction, with the liquid initially filling the entire cross-section of the inside of the tube on its side of the heat exchange surface.

Such a method is entirely suitable when the liquid to be evaporated is available in large volumes which can be discharged at a high rate, in particular in the case where water is to be evaporated.

When only a limited volume of liquid to be evaporated is available, e.g. when said liquid is relatively expensive and constitutes an intermediate heat exchange fluid between two other fluids, such a method ties up a large volume of liquid circulating in a closed circuit.

Preferred implementations of the present invention remedy said drawback by providing a method of evaporating a pure liquid which method allows optimum use of the heat exchange capacity of a heat exchange surface for a relatively small volume of liquid to be evaporated. In particular, the invention can be used to evaporate or heat a liquid flowing at high speed using heat from a fluid with an appreciably higher boiling point by means of a small volume of an intermediate heat exchange fluid circulating in a closed circuit.

SUMMARY OF THE INVENTION

The present invention provides a method of evaporating a pure liquid by indirect heat exchange between it and a hotter fluid, said liquid flowing under the effect of gravity along a heat exchange surface with the vapour formed flowing in the same direction as the liquid, wherein the liquid flow speed is adjusted as a function of the heat exchanged via the heat exchange surface so that at least half of the liquid has evaporated by the time the remaining liquid reaches the bottom of the heat exchange surface.

When the heat exchange surface is formed by the surface of vertical tubes, the liquid to be evaporated is made to stream down in thin sheets on the inside surfaces of the tubes. The flow speed of the liquid to be evaporated is adjusted so that about 90% of the liquid is evaporated when the residual liquid reaches the bottom of the heat exchange surface.

BRIEF DESCRIPTION OF THE DRAWING

A tube of an apparatus for evaporating monochlorotrifluoromethane refrigerant liquid by heat exchange with water in which apparatus the monochlorotrifluoromethane serves by condensation to heat and/or evaporate liquid natural gas is described hereinafter by way of example and with reference to the sole FIGURE of the accompanying drawing.

MORE DETAILED DESCRIPTION

Liquid monochlorotrifluoromethane is available at +5° C. at an absolute pressure of 22.8 bars and is evaporated in the tubes where heat is exchanged with water at 13° C. and at atmospheric pressure.

The single FIGURE very schematically illustrates on an enlarged scale one of the tubes. Said tube 1 is welded or cold welded to a perforated disc 2 through which the refrigerant liquid 3 arrives. The top of the tube may optionally be equipped with a known type of device for admitting the liquid into the tube and facilitating the formation of a film of liquid thereon. The liquid flows in a thin layer 4 over the inside wall of the tube in the direction of arrows 5, while the vapour formed flows in the same direction in the center of the tube as illustrated by arrows 6. The film of refrigerant liquid is about 1 mm thick at the top of the tube and reduces to about 0.1 mm at the bottom of the tube adjacent the lower perforated disk 7, with about 90% of the refrigerant liquid evaporating in transit.

It will be understood that in practice the tubes comprises a very large number of vertical tubes that are several meters long and of small inside diameter, e.g. 25 mm.

Previously described downflow apparatus has only been used for concentrating solutions, in which case only a small fraction of the original liquid is evaporated so as to avoid scaling and deposits on the heat exchange surface. The thickness of the liquid film is therefore virtually constant.

The method of the invention allows the volume of refrigerant liquid contained in the heat exchange apparatus as a whole to be smaller than that in a method where the entire cross-section of the tubes is filled with the liquid to be evaporated.

Although the method described with reference to the FIGURE of the drawing appears to be the preferred implementation of the invention, it will be understood that various modifications can be made thereto without going beyond the scope thereof. In particular, the heat exchange surface could be constituted by plates.

We claim:

1. A method of evaporating a pure liquid by indirect heat exchange between it and a hotter fluid, said method comprising the step of flowing said liquid under the effect of gravity along a heat exchange surface from the top to the bottom with the vapour formed flowing in the same direction as the liquid, the improvement comprising adjusting the liquid flow speed as a function of the heat exchanged via the heat exchange surface so that at least half of the liquid has evaporated by the time the remaining liquid reaches the bottom of the heat exchange surface.

2. A method according to claim 1, wherein the heat exchange surface comprises the inside surface of at least one vertical tube, and wherein the liquid to be evaporated is made to stream down in a thin sheet on the inside surface of said at least one tube.

3. A method according to claim 1, wherein the flow of the liquid to be evaporated is adjusted so that about 90% of the liquid is evaporated when the residual liquid reaches the bottom of the heat exchange surface.

* * * * *